March 10, 1942.     F. T. BUZARD     2,276,261
COMBINED MIXING AND EXTRUDING MACHINE
Filed June 18, 1940     4 Sheets-Sheet 1
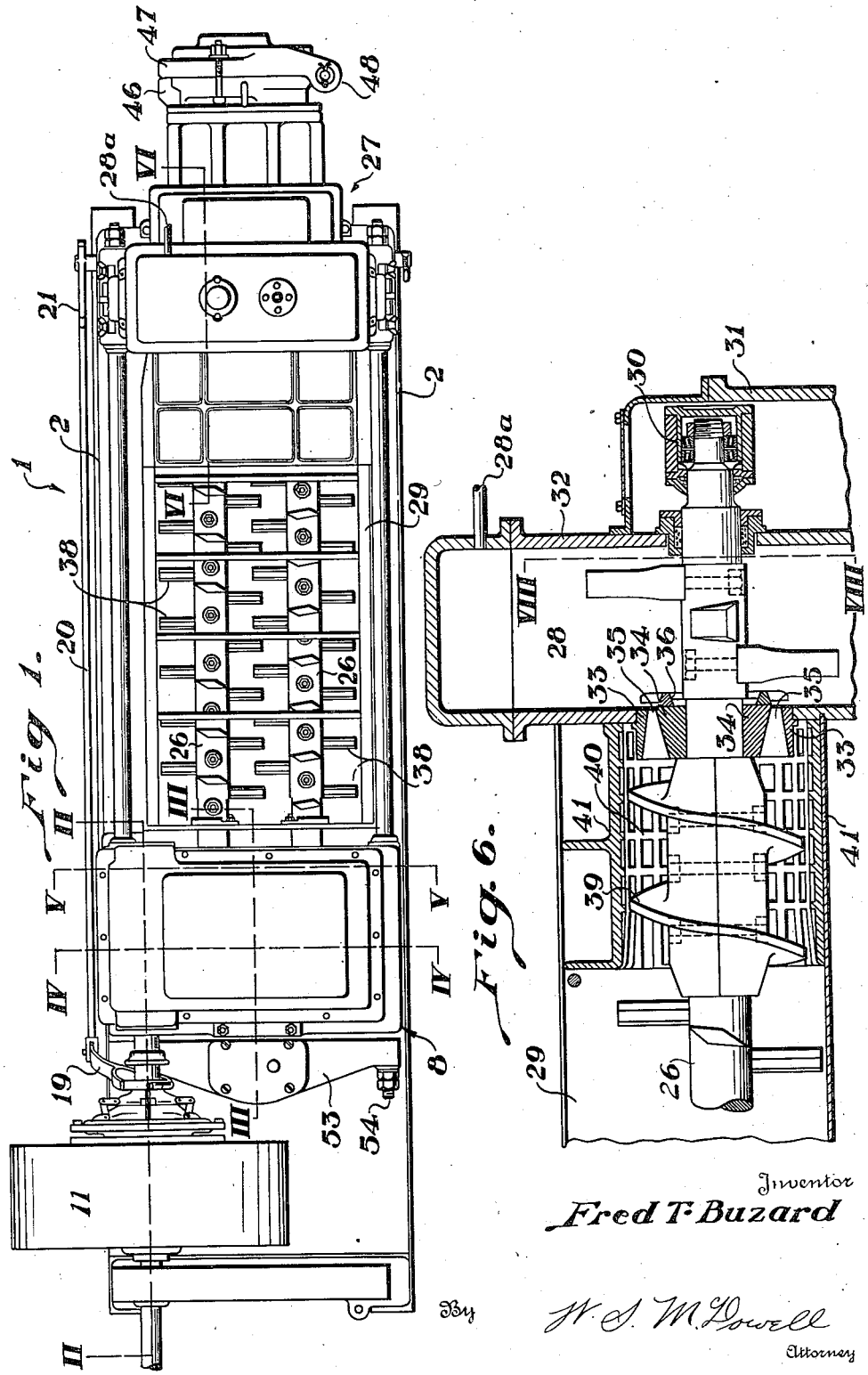
Inventor
Fred T. Buzard
By
W. S. McDowell
Attorney March 10, 1942.  F. T. BUZARD  2,276,261
COMBINED MIXING AND EXTRUDING MACHINE
Filed June 18, 1940    4 Sheets-Sheet 2
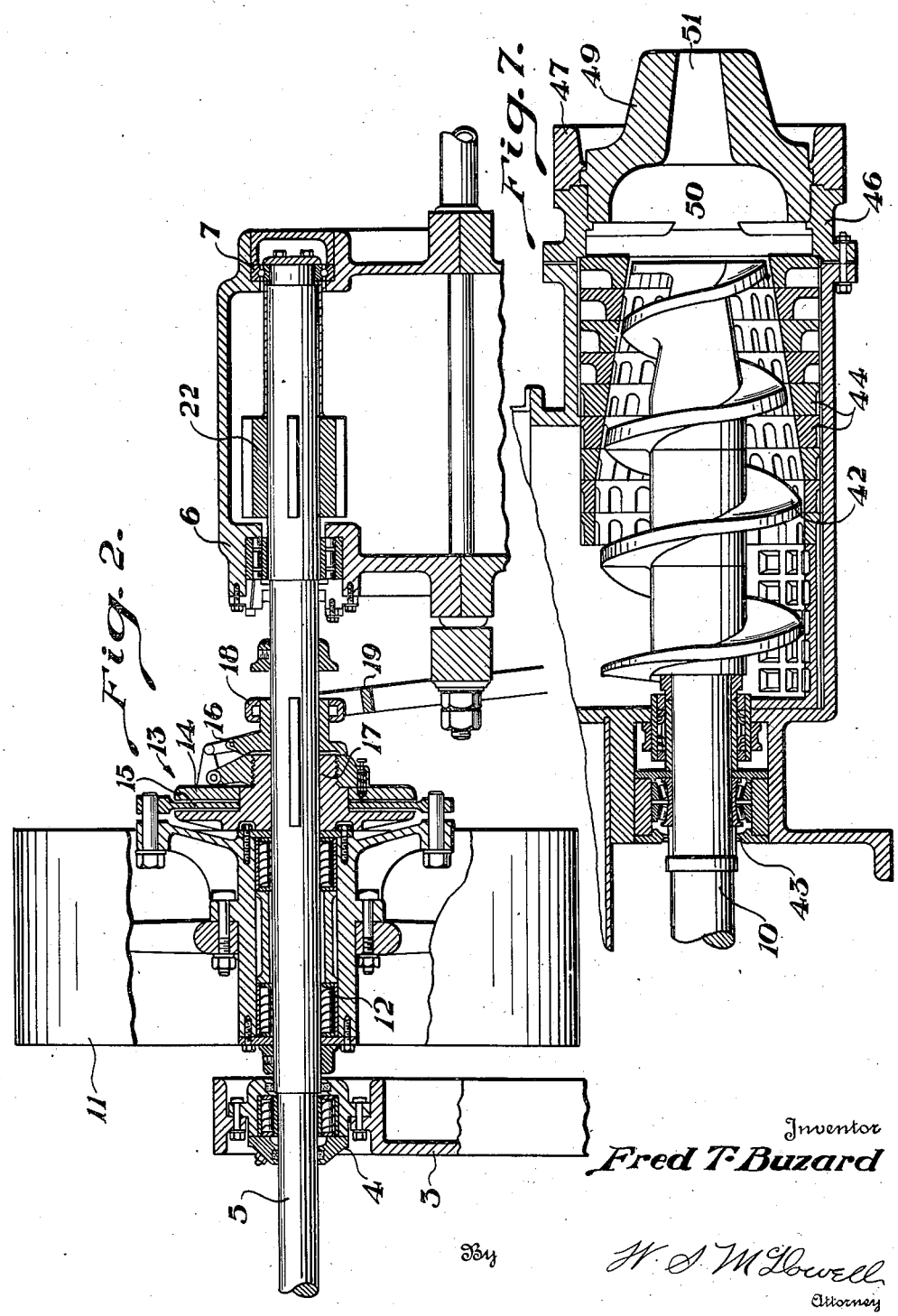
Inventor
*Fred T. Buzard*
By
*W. S. McDowell*
Attorney

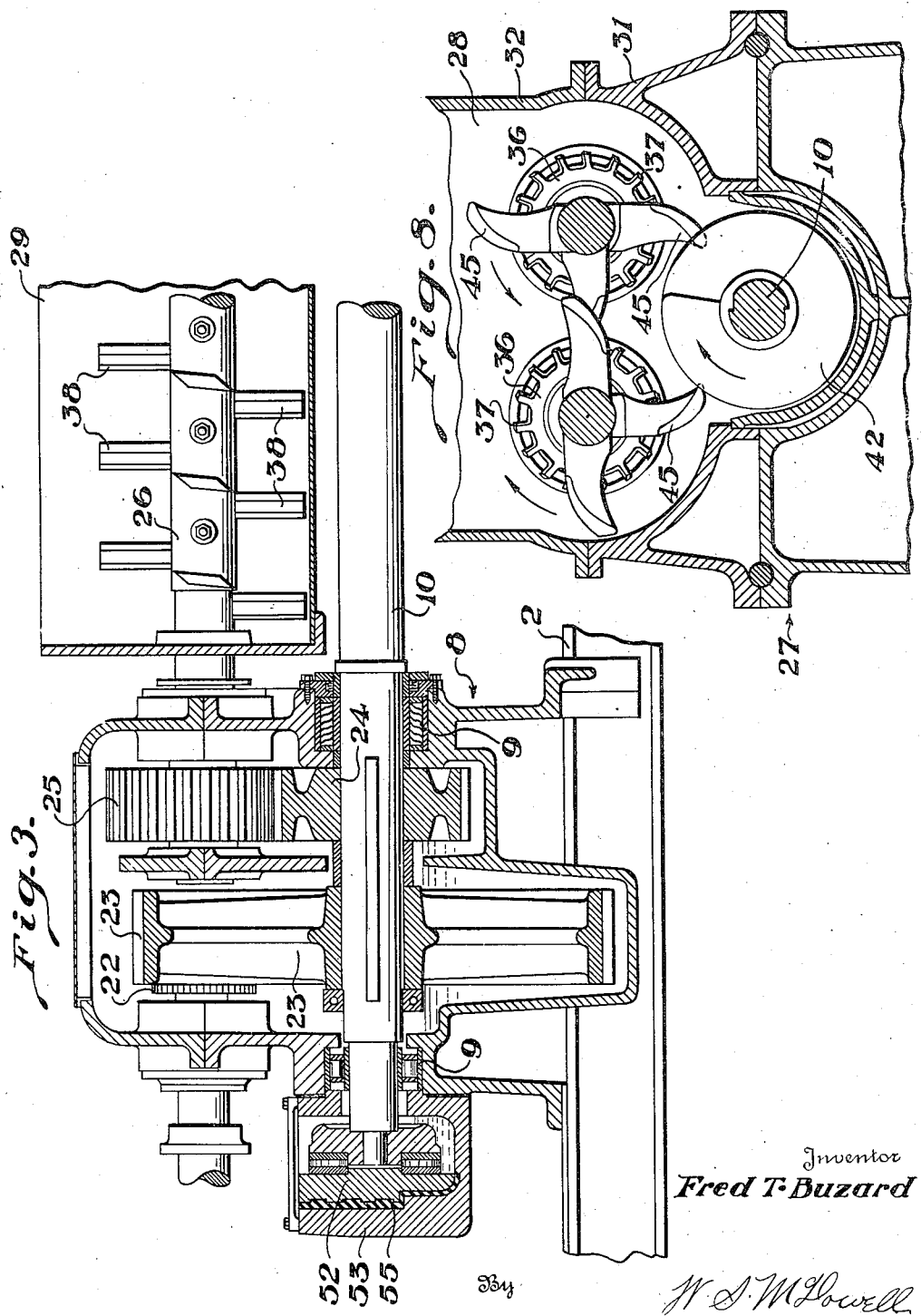

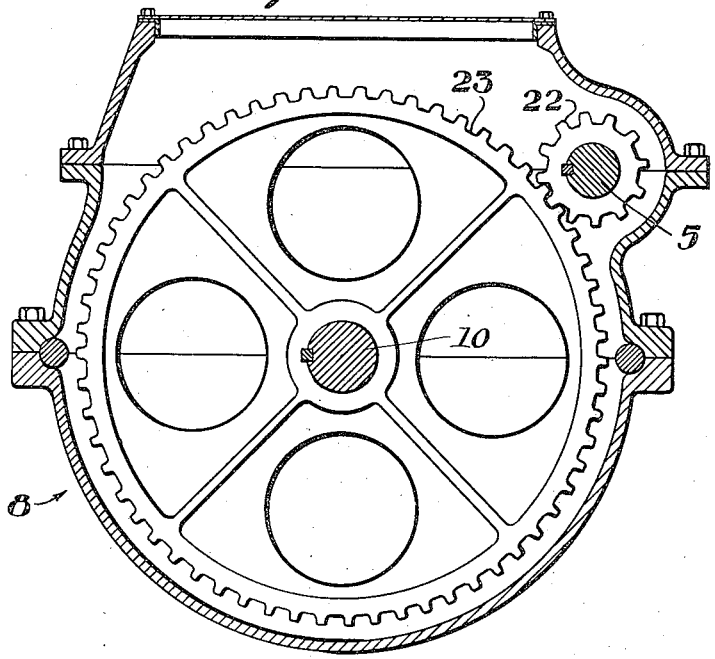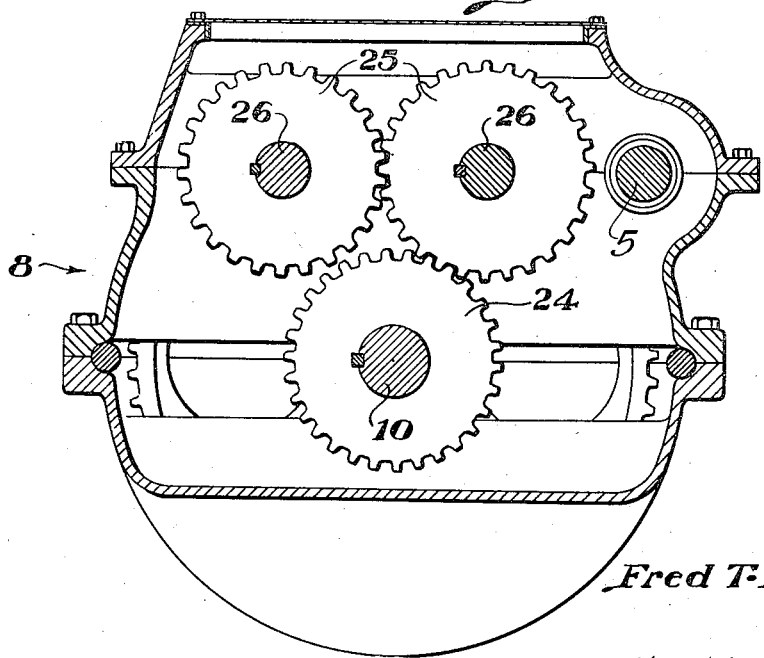

Patented Mar. 10, 1942

2,276,261

UNITED STATES PATENT OFFICE 2,276,261

COMBINED MIXING AND EXTRUDING MACHINE

Fred T. Buzard, Plymouth, Ohio, assignor to The Fate-Root-Heath Company, Plymouth, Ohio, a corporation of Ohio Application June 18, 1940, Serial No. 341,151

10 Claims. (Cl. 25—14)

This invention relates generally to machinery for extruding clay or similar materials and is particularly directed to a machine for mixing and extruding non-plastic agglomerates from which briquettes may be formed.

In an extruding machine of the types previously provided, a single auger shaft was employed which extended through an open topped chamber into which the clay or other material to be extruded was placed and through an extruding passage leading from the open-topped chamber to the forming die. A helical blade was provided on the shaft within the receiving hopper to mix and convey the materials to an auger screw called the expressing auger disposed in the extruding passage. Such prior machines were objectionable in that the materials were not sufficiently intermixed and air was entrapped therein which expanded after passing through the forming die and caused air pockets in the articles produced. Since the feeding and expressing augers were arranged on the same shaft, an excessive amount of end thrust was produced and the frequency of service and replacement of parts increased. In addition, the mounting of both augers on one shaft or in longitudinal registration greatly increased the length of the machine and the floor space required thereby.

It is the primary object of the present invention to provide an extruding machine which will avoid the above and other objections and be particularly suitable for mixing and extruding non-plastic materials such as a mixture formed from coal particles and a binding agent.

It is also an object of the invention to provide an extruding machine having an open topped mixing chamber with a pair of shafts extending longitudinally therethrough, the shafts being formed with helically disposed separate knife elements which pass through the material disposed in the chamber to intimately mix the various constituents thereof and at the same time convey the mixed materials toward a separate expressing or extruding auger disposed in an outlet passage located in spaced relation from the mixing chamber. Through the provision of the plurality of shafts, the length of the mixing chamber can be maintained at a minimum and yet a superior mixing action will result which will be further improved by reason of the separate knife elements.

Another object resides in providing the machine with a compartment between the mixing chamber and the outlet passage, a vacuum or negative pressure being induced in the compartment so that any air contained within the mixture delivered thereto will be extracted, thus enabling a more compact and better product to be produced.

A still further object rests in positioning insert means in the mixing chamber at the end adjacent the vacuum compartment, the inserts providing a pair of passages through which the mixed materials pass from the mixing chamber to the vacuum chamber, the shafts also extending through the passages and being provided with auger screws therein to facilitate movement of the mixed material, shredding die means being provided at the discharge ends of the passages to reduce the mixed material to pieces of small proportions whereby air contained therein will be more readily liberated in the vacuum chamber. By providing the shredder dies with reduced openings, the material will be packed at the inlet side thereof by the auger screws and a seal will be effected at this point permitting the pressures to be lowered in the vacuum chamber.

It is also a further object to provide the extruding machine with a third shaft between and below the first and second shafts, the third shaft extending through a discharge passage leading from the vacuum chamber to the exterior of the machine. Within the vacuum chamber and said passage, the third shaft is provided with an expressing or extruding auger by means of which the mixed and shredded material is fed to a forming die clamped to the forward or discharge end of the machine in registration with the discharge passage which decreases in cross-sectional area from the inlet to the discharge end so that the materials will also be compressed therein and air will be precluded from flowing into the vacuum chamber.

Another object rests in providing the first and second shafts within the vacuum chamber with a plurality of feeder fingers and so disposing the shafts with relation to the expressing or extruding auger that the end portions of the feeder fingers will pass between the convolutions of the expressing auger blade upon rotation of the first and second shafts whereby to pack the mixed de-aerated material deeply into the expressing auger and the operation of the machine made more efficient, motion transmitting and timing gearing being provided to regulate the speed of the shafts so that the feeder fingers will not engage the expressing auger blade.

Another desirable feature of the invention results from removably securing the cutter knives, feeder fingers, inserts and shredder means to the various parts of the machine in order that these parts may be removed and replaced without entirely dismantling the machine, the time required for servicing thus being reduced to a minimum.

For a more complete understanding of the invention, reference is to be had to the following description and the accompanying drawings in which a machine formed in accordance with the invention has been illustrated in detail.

In the drawings:

Fig. 1 is a plan view of a machine formed in accordance with the present invention;

Fig. 2 is a vertical longitudinal sectional view taken on the plane indicated by the line II—II of Fig. 1;

Fig. 3 is a similar view taken on the plane indicated by the line III—III of Fig. 1;

Fig. 4 is a detail vertical transverse sectional view taken on the plane indicated by the line IV—IV of Fig. 1;

Fig. 5 is a similar view taken on the plane indicated by the line V—V of Fig. 1;

Fig. 6 is a detail vertical longitudinal sectional view taken on the plane indicated by the line VI—VI of Fig. 1;

Fig. 7 is a vertical longitudinal sectional view taken through the outlet passage and expressing auger of the machine;

Fig. 8 is a detail vertical transverse sectional view taken on the plane indicated by the line VIII—VIII of Fig. 6.

Referring more particularly to the drawings, the numeral 1 designates the machine in its entirety. In this instance, the machine includes a pair of transversely spaced longitudinally extending beam members 2 which function as the base for the machine and serve to support a plurality of metallic castings which cooperate to form the body of the machine in which a plurality of chambers are formed. The chambers are spaced longitudinally of the beam members. At one end of the beam members, there is provided a bracket 3 in the upper portion of which there is positioned a bearing assembly 4 for the rotatable reception of a counter shaft 5. This shaft is journaled in additional bearings 6 and 7 which are clamped in sockets provided in portions of the metallic castings.

The castings are preferably arranged in groups, one group 8 being composed of a plurality of superposed sections which, when secured together, form a transmission chamber for the reception of power transmitting and reduction gearing. The bearing sockets in which the bearings 6 and 7 are positioned are provided in this group of castings and serve to locate the counter shaft with respect to a second set of bearing sockets 9 which receive antifriction bearings in which one end of a main shaft 10 is journaled. The counter shaft is provided with an enlarged pulley wheel 11 between the bracket 3 and the transmission case. The pulley wheel is supported for rotation on the countershaft by bearings 12 disposed in the hub thereof.

At one side of the pulley wheel, there is provided a clutch mechanism 13 which includes a pair of clutch plates 14 spaced by a third clutch plate 15 secured for rotation with the pulley wheel. Mechanism 16 is provided for moving the clutch plates 14 toward one another to frictionally secure them to the clutch plate 15 and provide for rotation of the plates 14 in unison with the pulley wheel. The plates 14 are carried by a hub member 17 which is keyed to the shaft 5 in order that when the clutch plates are clamped together, the countershaft will rotate at the same rate of speed as the pulley wheel. The mechanism 16 includes a collar 18 through which movement to clamp the clutch plates is transmitted by a yoke member 19 from a rod 20 and a manually operated lever 21 connected therewith, the lever 21 being located at the forward end of the machine and pivotally mounted thereon.

Within the gear case, the shaft 5 is provided with a pinion 22, the teeth of which mesh with the teeth of a larger gear wheel 23 carried by the main shaft 10. Also keyed to the main shaft within the transmission casing is a smaller gear 24 through which power is transmitted from the shaft 10 to a pair of intermeshing gears 25 carried by one end of a pair of transversely spaced shafts 26. From Fig. 5, it will be noted that one of the shafts 26 is disposed in closer relation to the main shaft 10 than the other shaft and the gear 25 thereon has its teeth disposed in meshing engagement with the teeth of the gear 24. By this arrangement, when rotary movement is imparted to the gear 24, the shafts 26 will be driven in opposite directions. The purpose of this direction of rotation will be set forth later.

At the forward end of the base portion of the machine, a second group 27 of castings is provided which group forms a vacuum or de-airing chamber 28. Between the two groups of castings, an elongated trough-like member 29 is supported, this member serving as a pugging chamber to receive the materials to be mixed and extruded. The shafts 26 extend longitudinally through the member 29 and also through the vacuum chamber, the forward ends of the shafts being journaled in bearings 30 provided in the front wall of the upper castings 31 and 32 of the group 27.

The rear wall of the castings 31 and 32 receive the outer ring portions of die members 33 which surround the shafts 26 and cooperate with other die members 34 carried by the shafts 26 to form relatively small openings 35 through which communication between the vacuum chamber and the pugging chamber is established. On the outlet side of the dies, the shafts 26 have shredder disks 36 secured for rotation therewith. The disks have radially extending projections 37 which pass the openings 35 and reduce mixed material passing therethrough to minimum proportions.

Prior to reaching the dies, the material, after being introduced to the chamber 29, is mixed through engagement with knife members 38 projecting radially from the shafts 26. These knife members are disposed in spiral order around the shafts and serve to mix the materials introduced to the trough member and advance them longitudinally thereof. The rate of advancement is relatively slow since the knives are spaced and do not form a continuous conveyor screw. By reason of the spacing of the knife members and the fact that the end portions overlap as the knives rotate, a more intimate mixture of the materials will result. After the knife members have advanced the materials to the forward end of the pugging chamber, conveyor screws 39 continue the advancement thereof to the shredder dies. The conveyor screws 39 are disposed for rotation in passages 40 provided by insert members 41 secured in the end of the pugging chamber adjacent the vacuum chamber. The knife members, the conveyor screw sections and the die sections are made removable in order that in the event they become broken or dulled, they may be removed and replaced without entirely dismantling the machine. After the materials have passed through the dies and have been shredded by the cutter disks 36, they will drop downwardly into the lower portion of the vacuum chamber where they will remain until a sufficient amount has accumulated to be picked up by a continuous expressing or extruding auger 42 connected with the forward end of the main shaft 10. At the rear of the extruding auger, the main shaft is provided with antifriction bearings 43 for the rotatable support of the forward portion of the main shaft. The longitudinal axis of this shaft is in registration with the longitudinal axis of a discharge passage which extends from the lower portion of the vacuum chamber to the exterior of the machine.

This discharge passage is formed from a plurality of plate-like sections 44 formed with central openings which, when the plates are assembled as illustrated in Fig. 7, form the discharge passage. The size of the openings decrease from the inner to the outer section to provide a converging discharge passage. The blade of the expressing auger also decreases in diameter to conform to the convergence of the passage. To insure the proper disposition of the shredded materials in the expressing auger, the shafts 26 within the vacuum chamber are equipped with feeder fingers 45. These members are spirally arranged on the shafts 26 and extend radially therefrom. The feeder fingers are independently secured to the shafts in order that they may be removed in the event replacement becomes necessary.

As disclosed in Fig. 8, the length of the feeder fingers and the relative positions of the shafts 10 and 26 are such that the outer end portions of the fingers pass between the convolutions of the expressing auger when the shafts 26 are revolved. The speed of revolution of the shafts is so timed that there will be no engagement of the feeder fingers with the auger blades or one another.

The lower castings of the group 27 extend forwardly from the vacuum chamber and provide a tubular housing for the plates 44, the latter being securely retained within the housing by a collar 46 clamped to the forward end of the castings. A second collar 47 is pivotally secured to the collar 46 as at 48 and serves to clamp an extruding die 49 in alignment with the discharge passage. The inner end of the die is relieved and cooperates with the inner portion of the collar 46 to form a pocket 50 in which the material may collect before passing through the die 49.

In the operation of the machine, the materials to be mixed and extruded are introduced into the open topped pugging chamber and are then mixed and moved longitudinally by the knives 38 to the auger screws 39 by means of which the materials are forced through the openings 35 to the vacuum chamber. As these materials pass through the openings, the shredder knives disintegrate the materials which will then fall to the lower portion of the vacuum chamber and be picked up or move longitudinally by the expressing auger 42. After a sufficient quantity of the materials are collected in the pocket 50, a resistance to the movement of material through the discharge passage will be built up. At this time, the air may be exhausted from the vacuum chamber through pipe line 28a by a suitable pump, not shown. Due to the reduced openings 35 and the fact that the materials are packed in front of these openings by the auger screws 39, an effective seal will be produced where the materials enter the vacuum chamber. A similar seal will result at the discharge passage since the material will be packed in the pocket 50 by the expressing auger. Since all or the major portion of the air is exhausted from the materials, a greater degree of compaction may be secured.

The removal of the air from the materials is also facilitated by the shredding operation since the materials are reduced to such small proportions that little, if any, air can remain therein. By reason of the feeder fingers, the reduced material is prevented from packing or bridging in the vacuum chamber and an effective seal will be secured at the discharge end of the machine even though the materials are continuously extruded therefrom. The extrusion die 49 is formed with a greatly reduced opening 51 through which the material passes in the extruding operation. Due to the reduced size, high back pressures will result and a strong tendency to move the main shaft rearwardly will be developed.

To resist this rearward movement, a thrust bearing 52 is provided at the rear end of the main shaft. This bearing is carried in a cross head 53 which extends transversely of the machine and is formed with openings at its end portions for the reception of tie rods 54. These members extend longitudinally of the machine and pass through the spaced groups of castings, the end portions of the tie rods being provided with nuts to clamp the various portions of the machine together. The thrust bearing 52 is spaced from the rear wall of the cross head by a resilient pad 55 which serves to absorb abnormal shocks and greatly increases the life of the thrust bearing.

What is claimed is:

1. A combined mixing and extruding machine comprising a body formed with aligned mixing and de-airing chambers, a plurality of shafts rotatably supported by said body in parallel relationship, said shafts extending longitudinally through said chambers, a plurality of knife members projecting from said shafts in said mixing chamber, said knives being arranged in spiral order around said shafts, an auger screw on each shaft adjacent the de-airing chamber, shredder means disposed within said de-airing chamber adjacent to the entrance thereto from said mixing chamber, feeder finger members projecting from said shafts in spaced order within said de-airing chamber, a passageway extending from the de-airing chamber to the exterior of the machine, said passageway being disposed below the level of said shafts and decreasing in cross-sectional area from its inner to its outer end, an extruding auger extending longitudinally of said passageway and rotatably supported therein, the relative positions of said extruding auger and said shafts being such that said feeder finger members project into the path of movement of said extruding auger blade, and means for imparting rotary movement to said shafts and extruding auger, said shafts being rotated in opposite directions.

2. A combined mixing and extruding machine comprising a body provided with aligned mixing and de-airing chambers, a pair of spaced parallel shafts rotatably supported by said body and extending through said chambers, a plurality of knife members radiating from said shafts within said mixing chambers, said knife members being disposed in spiral order around said shafts, an auger screw carried by each shaft adjacent the de-airing chamber, shredder means disposed within said de-airing chamber, a plurality of feeder finger members projecting from said shafts in longitudinally and circumferentially spaced order within said de-airing chamber, a passageway extending from said de-airing chamber to the exterior of said machine between and below said shafts, said passage decreasing in cross-sectional area from the inner to the outer end thereof, an extruding auger disposed for rotation within said passageway, the outer ends of said feeder fingers passing through the path of movement of the blade of said extruding auger upon movement of said shafts, and means for imparting rotary movement to said shafts and extruding auger, said shafts being rotated in opposite directions.

3. A combined mixing and extruding machine comprising a body provided with aligned mixing and de-airing chambers, a pair of spaced parallel shafts rotatably supported by said body and extending through said chambers, a plurality of knife members radiating from said shafts within said mixing chambers, said knife members being disposed in spiral order around said shafts, an auger screw carried by each shaft adjacent the de-airing chamber, die means having reduced openings disposed between said auger screws and said de-airing chamber, shredder knife members carried by said shafts within said de-airing chamber in close proximity to said die means, feeder finger members carried in circumferentially spaced order by said shafts within said de-airing chamber, a passageway extending from said de-airing chamber to the exterior of said machine, said passageway decreasing in size from the inner to the outer end thereof and having the longitudinal axis thereof disposed between and below said shafts, an extruding auger rotatably supported in said passageway, the axis of rotation of said auger being so disposed with respect to said shafts that said feeder fingers pass through the path of movement of the blade of said auger upon rotation of said shafts, and means for imparting rotary movement to said shafts and said extrusion auger, said shafts being rotated in opposite directions.

4. A combined mixing and extruding machine comprising a body provided with adjoining mixing and de-airing chambers, a pair of spaced parallel horizontally extending shafts journaled in said body and extending through said chambers, a third shaft disposed below said pair of shafts and in parallel relation thereto, said third shaft being disposed in closer relationship to one shaft of said pair, gear means carried by said shafts, the gear on said third shafts being in meshing relation with the gear on the nearest shaft of said pair and the gears on said pair of shafts being in meshing relation whereby rotary motion imparted to said third shaft will cause the shafts of said pair to rotate in opposite directions, spirally disposed spaced knife members carried by each shaft of said pair within said mixing chamber, die means surrounding said shafts at one end of said mixing chamber, said die means being formed with reduced openings establishing communication between said mixing and de-airing chambers, auger screws carried by said pair of shafts within said mixing chamber for feeding mixed material to said de-airing chamber through said die means, shredder disks rotatable with said shafts on the outlet side of said die means for reducing the mixed material to small proportions, feeding fingers carried by said pair of shafts within said de-airing chamber, a converging passageway extending from the lower portion of said de-airing chamber to the exterior, said third shaft being disposed axially of said passageway, an auger blade carried by said third shaft within said passageway, and means for imparting rotary motion to said third shaft.

5. A combined mixing and extruding machine comprising a body formed with aligned mixing and de-airing chambers, a plurality of shafts rotatably supported by said body in parallel relationship, said shafts extending longitudinally through said chambers, a plurality of knife members removably secured to said shafts within said mixing chamber, said knives being disposed in spiral order around said shafts, a sectional auger screw removably secured to each shaft adjacent the de-airing chamber, removable shredder means surrounding said shafts within the de-airing chamber and adjacent to said auger screws, feeder finger members detachably carried by said shafts within said de-airing chamber, a passageway leading from the lower portion of said de-airing chamber to the exterior of said machine, said passageway decreasing in cross-sectional area from the inner to the outer end thereof, an extruding auger rotatably supported in axial relation within said passageway, the relative position of said shafts and extruding auger being such that said feeder fingers pass through the path of movement of said auger blade upon rotation of said shafts, and means for rotating said shafts and extruding auger in timed relation to prevent engagement of the auger blade with said feeder fingers.

6. A combined mixing and extruding machine comprising a body having adjoining mixing and de-airing chambers, said mixing chamber having an open top, a pair of horizontally registering parallel shafts journaled in said body and extending through said chambers, insert means disposed in the end of said mixing chamber adjacent said de-airing chamber, said insert means providing a pair of relatively reduced passages, a die provided in each passage, said dies having reduced openings establishing communication between the passages and said de-airing chamber, auger screw means carried by said shafts within said passages for feeding mixed material to said dies, shredder knife disks secured to said shafts at the outlet ends of said dies, feeder finger members mounted on said shafts within said de-airing chamber, a converging passage leading from the lower portion of said de-airing chamber, an extruding auger supported for rotation in said converging passage, and means for imparting rotary movement to said shafts and extruding auger.

7. A combined mixing and extruding machine comprising a body having adjoining mixing and de-airing chambers, said mixing chamber having an open top, a pair of horizontally registering parallel shafts journaled in said body and extending through said chambers, removable insert means disposed in the end of said mixing chamber adjacent said de-airing chamber, said insert means providing a pair of relatively reduced passages, a removable die provided in each passage, said dies having reduced openings establishing communication between the passages and said de-airing chamber, removable auger screw means carried by said shafts within said passages for feeding mixed material to said dies, shredder knife disks secured to said shafts at the outlet ends of said dies, removable feeder finger members mounted on said shafts within said de-airing chamber, a converging passage leading from the lower portion of said de-airing chamber, an extruding auger supported for rotation in said converging passage, and means for imparting rotary movement to said shafts and extruding auger.

8. In an extruding machine of the type having a mixing chamber and a plurality of blade supporting shafts rotatably positioned in said chamber, a de-airing chamber adjacent to the end of said mixing chamber, shredding means surrounding each shaft within said mixing chamber, an auger blade carried by each shaft in advance of said shredding means, feeder fingers carried by said shafts within said de-airing chamber, a passage leading from the lower portion of said de-airing chamber to the exterior of said machine, a shaping die at the discharge end of said passage, a shaft extending longitudinally of said passage and being revoluble therein, an auger blade fixed to said shaft, means for exhausting air from said de-airing chamber, and means for imparting rotation to said shafts.

9. In an extruding machine of the type having a mixing chamber and a pair of blade carrying shafts revolubly supported therein, a de-airing chamber adjacent to the discharge end of said mixing chamber, means between said mixing and de-airing chambers for continuously introducing shredded material to the latter chamber, an outlet passage extending from the lower portion of said de-airing chamber to the exterior of said machine, a shaping die at the discharge end of said passage, an auger revolubly positioned in said passage for feeding the shredded material through said passage to said die, and means carried by the shafts of said pair within said de-airing chamber for agitating the shredded material and feeding the same to the auger in said outlet passage.

10. A combined mixing and extruding machine comprising a body having an open-topped chamber and a closed de-airing chamber at one end thereof, a pair of passages establishing communication between said chambers, a pair of shafts extending through said chambers and passages, longitudinally and circumferentially spaced mixing knife blades carried by said shafts within said open-topped chamber, an auger secured to each shaft within said passages, die means mounted between said passages and said de-airing chamber, shredder blades fixed to said shafts within said de-airing chamber in close relation to said die means, agitating fingers projecting radially from said shafts in longitudinally spaced order within said de-airing chamber, means for extracting air from said de-airing chamber, a discharge passage leading from the lower portion of the de-airing chamber to the exterior of the machine, an extrusion die disposed at the outlet end of said discharge passage, an extrusion auger extending from the lower portion of said de-airing chamber into said discharge passage, and means for imparting rotary movement to said shafts and augers.

FRED T. BUZARD.